J. H. McCONNELL.

Cooking Stove.

No. 92,464.

Patented July 13, 1869.

United States Patent Office.

JAMES H. McCONNELL, OF NEWCASTLE, PENNSYLVANIA, ASSIGNOR TO HIMSELF AND J. R. RICHARDSON.

Letters Patent No. 92,464, dated July 13, 1869.

---

COOKING-STOVE.

---

The Schedule referred to in these Letters Patent and making part of the same.

---

*To all whom it may concern:*

Be it known that I, JAMES H. McCONNELL, of Newcastle, in the county of Lawrence, and in the State of Pennsylvania, have invented certain new and useful Improvements in Cooking-Stoves; and do hereby declare that the following is a full, clear, and exact description thereof, reference being had to the accompanying drawings, and to the letters of reference marked thereon.

The nature of my invention consists in the construction and arrangement of an attachment for cooking-stoves.

In order to enable others skilled in the art to which my invention appertains, to make and use the same, I will now proceed to describe its construction and operation, referring to the annexed drawings, which form a part of this specification, and in which—

A represents a chamber or pan of sheet-iron, and of any dimensions desired, having an opening in the centre of its bottom. This opening should be of such size as to fit over the collar found on the rear portion of a cooking-stove, on which the pipe is usually placed.

Figure 1:
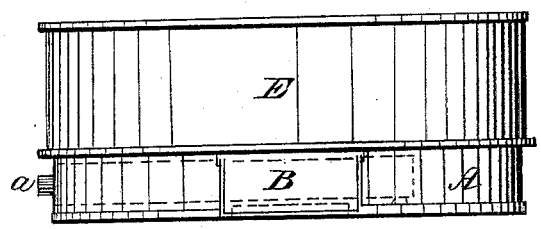
Figure 1 is a rear elevation.
Figure 2:
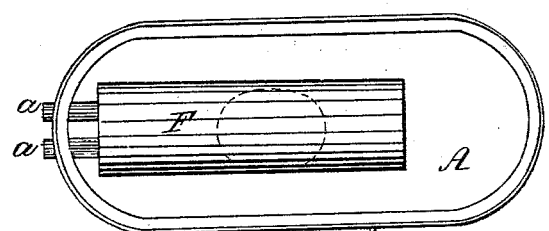
Figure 2 is a plan view, showing the inside of the lower chamber.
Figure 3:
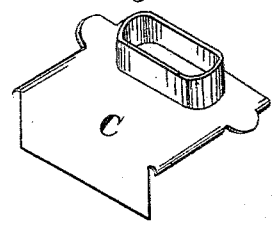
Figure 3 is a perspective of a cover, which may be used on the rear portion of my attachment.
Figure 4:
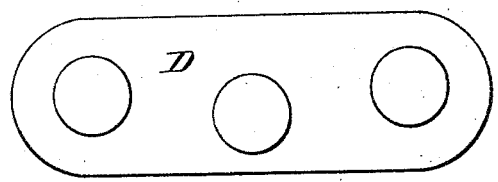
Figure 4 is a plan view of a cover or plate to the main portion of the same.

The pan A has an extension, B, on the rear side, which may lead into the chimney-flue, or the top of said extension may be replaced by another plate, C, fig. 3, having an opening with a collar, on which the stove-pipe may be placed.

The top of the pan A may be covered with a movable plate, D, which is provided with several holes, to place cooking-utensils upon. This plate may be removed, and a boiler, E, placed on the pan.

By this attachment, all the heat, which usually goes direct up through the stove-pipe, has to pass through the pan A, heating the articles placed on the same before it passes it, thus increasing the capacity of the stove to a considerable degree.

Inside of the pan A, I place a water-heater, F, having two pipes $a\ a$, which pass out through the side of the pan, and serve to make attachments with a tank or receiver, to hold hot water.

Having thus fully described my invention,

What I claim as new, and desire to secure by Letters Patent, is—

1. In combination with a cooking-stove, the pan A, constructed as described, and provided with an extension, B, substantially as and for the purposes herein set forth.

2. In combination with the pan A and extension B, the plate C, constructed as described, and for the purposes set forth.

3. The combination of the pan A, extension B, and cover D, all substantially as and for the purposes herein set forth.

4. The combination of the pan A, extension B, and boiler E, substantially as shown and described.

In testimony that I claim the foregoing, I have hereunto set my hand, this 1st day of March, 1869.

JAMES H. McCONNELL.

Witnesses:
GEO. W. MILLER,
LEOPOLD EVERT.